(12) United States Patent
Solomon et al.

(10) Patent No.: US 11,312,100 B2
(45) Date of Patent: Apr. 26, 2022

(54) ARTICLE WITH MICROSTRUCTURED LAYER

(71) Applicant: 3M INNOVATIVE PROPERTIES COMPANY, St. Paul, MN (US)

(72) Inventors: Jeffrey L. Solomon, Vadnais Heights, MN (US); Saswata Chakraborty, Oakdale, MN (US); Robert J. Devoe, Minnetonka, MN (US); Wayne S. Mahoney, St. Paul, MN (US); Eric W. Nelson, Stillwater, MN (US); Kundapur Raveesh Shenoy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 34 days.

(21) Appl. No.: 16/066,903

(22) PCT Filed: Dec. 22, 2016

(86) PCT No.: PCT/US2016/068333
§ 371 (c)(1),
(2) Date: Jun. 28, 2018

(87) PCT Pub. No.: WO2017/116996
PCT Pub. Date: Jul. 6, 2017

(65) Prior Publication Data
US 2019/0016085 A1    Jan. 17, 2019

Related U.S. Application Data

(60) Provisional application No. 62/271,615, filed on Dec. 28, 2015.

(51) Int. Cl.
*B32B 3/30*    (2006.01)
*B32B 7/12*    (2006.01)
(Continued)

(52) U.S. Cl.
CPC .......... *B32B 3/30* (2013.01); *B29D 11/00788* (2013.01); *B32B 7/05* (2019.01);
(Continued)

(58) Field of Classification Search
CPC .. B32B 3/30; B32B 27/00; B32B 7/14; B32B 27/365; B32B 27/325; B32B 27/40;
(Continued)

(56) References Cited

U.S. PATENT DOCUMENTS 3,515,778 A    6/1970    Fields
4,097,634 A    6/1978    Bergh
(Continued)

FOREIGN PATENT DOCUMENTS

CN    1264840    8/2000
CN    104762050    8/2015
(Continued)

OTHER PUBLICATIONS

Sims et al; Sep. 2014; Understanding the Role of Fumed Silica in Adhesives and Sealants Formulations; Adhesives and Sealants Industry Magazine (Year: 2014).*
(Continued)

*Primary Examiner* — Nathan L Van Sell
(74) *Attorney, Agent, or Firm* — Jonathan L. Tolstedt

(57) ABSTRACT

Article comprising a first microstructured layer comprising a first material, and having first and second opposed major surfaces, the first major surface being a microstructured surface, and the microstructured surface having peaks and valleys, wherein the peaks are microstructural features each having a height defined by the distance between the peak of the respective microstructural feature and an adjacent valley; and a second layer comprising an adhesive material, and having a first and second opposed major surfaces, the adhesive material comprising a reaction product of a mixture
(Continued)

comprising (meth)acrylate and epoxy in the presence of each other, wherein at least a portion of the second major surface of the second layer is directly attached to at least a portion of the first major microstructured surface of the first layer.

10 Claims, 3 Drawing Sheets

(51) Int. Cl.
    *B32B 27/08*     (2006.01)
    *B32B 27/30*     (2006.01)
    *B32B 27/36*     (2006.01)
    *B32B 27/38*     (2006.01)
    *B32B 7/05*     (2019.01)
    *G02B 5/02*     (2006.01)
    *B32B 27/00*     (2006.01)
    *B29D 11/00*     (2006.01)
    *B32B 7/14*     (2006.01)
    *B32B 27/32*     (2006.01)
    *B32B 27/40*     (2006.01)
    *B32B 27/28*     (2006.01)
    *B32B 37/14*     (2006.01)
    *G02F 1/1335*     (2006.01)

(52) U.S. Cl.
CPC .......... *B32B 7/12* (2013.01); *B32B 7/14* (2013.01); *B32B 27/00* (2013.01); *B32B 27/08* (2013.01); *B32B 27/285* (2013.01); *B32B 27/308* (2013.01); *B32B 27/32* (2013.01); *B32B 27/325* (2013.01); *B32B 27/36* (2013.01); *B32B 27/365* (2013.01); *B32B 27/38* (2013.01); *B32B 27/40* (2013.01); *B32B 37/144* (2013.01); *G02B 5/02* (2013.01); *B29D 11/00326* (2013.01); *B32B 2250/24* (2013.01); *B32B 2270/00* (2013.01); *B32B 2305/72* (2013.01); *B32B 2307/40* (2013.01); *B32B 2307/416* (2013.01); *B32B 2307/418* (2013.01); *B32B 2307/42* (2013.01); *B32B 2307/50* (2013.01); *B32B 2307/518* (2013.01); *B32B 2307/732* (2013.01); *B32B 2307/748* (2013.01); *B32B 2457/20* (2013.01); *B32B 2551/00* (2013.01); *G02F 1/133607* (2021.01); *G02F 2202/022* (2013.01); *G02F 2202/28* (2013.01)

(58) Field of Classification Search
CPC ..... B32B 27/32; B32B 27/285; B32B 37/144; B32B 7/05; B32B 7/12; B32B 27/08; B32B 27/308; B32B 27/36; B32B 27/38; B32B 2307/50; B32B 2307/732; B32B 2307/40; B32B 2307/748; B32B 2305/72; B32B 2250/24; B32B 2270/00; B32B 2307/416; B32B 2307/418; B32B 2307/42; B32B 2307/518; B32B 2457/20; B32B 2551/00; G02B 5/02; G02B 5/0231; G02B 6/0061; B29D 11/00788; B29D 11/00326; G02F 2202/022; G02F 2202/28; G02F 2001/133607
See application file for complete search history.

(56) References Cited

U.S. PATENT DOCUMENTS

| | | |
|---|---|---|
| 4,576,850 A | 3/1986 | Martens |
| 5,175,030 A | 12/1992 | Lu |
| 5,182,069 A | 1/1993 | Wick |
| 5,183,597 A | 2/1993 | Lu |
| 5,252,694 A | 10/1993 | Willett et al. |
| 5,635,278 A | 6/1997 | Williams |
| 5,786,006 A | 7/1998 | Lindon |
| 6,784,962 B2 | 8/2004 | Sumida |
| 6,846,089 B2 | 1/2005 | Stevenson |
| 7,074,463 B2 | 7/2006 | Jones |
| 7,244,476 B2 | 7/2007 | Sumida |
| 7,678,443 B2 | 3/2010 | Schulz |
| 7,713,604 B2 | 5/2010 | Yang |
| 7,833,820 B2 | 11/2010 | Rantala |
| 8,123,384 B2 | 2/2012 | Negley |
| 8,282,863 B2 | 10/2012 | Jones |
| 8,623,140 B2 | 1/2014 | Yapel |
| 8,730,579 B2 | 5/2014 | Lee |
| 8,986,812 B2 | 3/2015 | Hunt |
| 9,102,083 B2 | 8/2015 | David |
| 2002/0081787 A1 | 6/2002 | Kohl |
| 2004/0042233 A1 | 4/2004 | Suzuki et al. |
| 2004/0102031 A1 | 5/2004 | Kloster |
| 2004/0137728 A1 | 7/2004 | Gallagher |
| 2004/0190102 A1 | 9/2004 | Mullen |
| 2005/0134963 A1* | 6/2005 | Stevenson .............. G02B 5/045 359/600 |
| 2005/0276916 A1 | 12/2005 | Yang et al. |
| 2007/0253072 A1 | 11/2007 | Mullen |
| 2008/0044602 A1 | 2/2008 | Weed et al. |
| 2008/0049451 A1 | 2/2008 | Wang |
| 2009/0041553 A1 | 2/2009 | Burke |
| 2009/0237773 A1 | 9/2009 | Cao et al. |
| 2010/0246021 A1 | 9/2010 | Sung |
| 2011/0085241 A1* | 4/2011 | Purchase .............. G02B 5/0215 359/599 |
| 2011/0126293 A1 | 5/2011 | Berengoltz |
| 2011/0157867 A1 | 6/2011 | Lin |
| 2011/0299012 A1 | 12/2011 | Wang |
| 2012/0097903 A1 | 4/2012 | Scheffer |
| 2013/0004728 A1 | 1/2013 | Boyd |
| 2014/0016208 A1 | 1/2014 | Edmonds |
| 2014/0185273 A1 | 2/2014 | Metral |
| 2014/0107282 A1* | 4/2014 | Tran .......... C09J 7/387 524/553 |
| 2014/0242343 A1 | 7/2014 | Tsai |
| 2014/0046837 A1 | 8/2014 | Free |
| 2015/0050750 A1 | 2/2015 | Sone |
| 2015/0277005 A1 | 10/2015 | Kim et al. |
| 2016/0002378 A1 | 1/2016 | Shimizu et al. |

FOREIGN PATENT DOCUMENTS

| | | | |
|---|---|---|---|
| CN | 105950029 | 9/2016 | |
| WO | WO 2011-126293 | 10/2011 | |
| WO | WO 2012-166460 | 12/2012 | |
| WO | WO-2013158475 A1 * | 10/2013 | .......... G02B 3/0056 |
| WO | WO 2014-014595 | 1/2014 | |
| WO | WO 2014-046837 | 3/2014 | |
| WO | WO 2015-050750 | 4/2015 | |
| WO | WO 2015-050862 | 4/2015 | |
| WO | WO 2015-108953 | 7/2015 | |
| WO | WO 2017-116984 | 7/2017 | |
| WO | WO 2017-116987 | 7/2017 | |
| WO | WO 2017-116991 | 7/2017 | |

OTHER PUBLICATIONS

Bass, "Transfer molding of nanoscale oxides using water-soluble templates", American chemical society, 2011, vol. 5, No. 5, pp. 4065-4072.
Nagato, "Iterative roller imprint of multilayered nanostructures", Elsevier Microelectronic engineering, 2010, vol. 87, pp. 1543-1545.
White, "Advanced Methods, Materials, and Devices for Microfluidics", Dissertation, Georgia Institute of Technology, Nov. 2003, pp. 001-241.
White, "Microsystems Manufacturing via Embossing of Photodefinable Thermally Sacrificial Materials", Proceedings of the SPIE, 2004, vol. 5374, pp. 361-370.

(56) References Cited

OTHER PUBLICATIONS

Hua, "Photodefinable Thermally Sacrificial Polycarbonate Materials & Methods for MEMS & Microfluidic Device Fabrication", ECS Trans, 2006, vol. 3, No. 10, pp. 389-397.
Frechet, "Thermally Depolymerizable Polycarbonates V. Acid catalyzed thermolysis of allylic and benzylic polycarbonates : A new route to resist imaging" Polymer Journal,1987, vol. 19, No. 1, pp. 31-49.
Jeon, "Vacuum Nano-Hole Array Embedded Organic Light Emitting Diodes.", Nanoscale, 2014, vol. 6, pp. 2642-2648.
Corbin, "Engineered porosity via tape casting, lamination and the percolation of pyrolyzable particulates", J.Am.Ceram.Soc, 1999, vol. 82, No. 7, pp. 1693-1701.
International Search report for PCT International Application No. PCT/US2016/068333 dated Feb. 21, 2017, 5 pages.

* cited by examiner

30μm

ARTICLE WITH MICROSTRUCTURED LAYER

BACKGROUND

Microstructured films can be useful in optical displays. For example, a prismatic microstructured film can act a brightness enhancement film. Two or more microstructured films can be used together in many kinds of optical displays. In addition, one or more other optical films may be used in optical displays in conjunction with one or more microstructured films. These microstructured films and other optical films are typically manufactured separately and incorporated into the optical display at the time of its manufacture, or are incorporated into a sub-assembly or component, that is intended for incorporation into an optical display, at the time of its manufacture. This can be an expensive, time, and/or labor-intensive manufacturing step. Some such microstructured films and other optical films are designed to include layers whose purpose is to provide stiffness or other advantages in handling during film manufacture, film converting, film transport, and optical display or sub-assembly component manufacture. This can add thickness and weight to such films beyond what would be necessary to fulfill their optical functions. Sometimes such microstructured films and other optical films are adhered to one another using an adhesive layer or layers when the optical display or sub-assembly component is manufactured. This too can add thickness and weight to the optical display or sub-assembly component, and it can sometimes also adversely affect the optics. Sometimes such microstructured films and other optical films must be very precisely arranged in an optical display in order for their principal optical axes to lie at precise angles to one another. This can be an expensive, time, and/or labor-intensive manufacturing step, and even slight misalignment can adversely affect optical performance. There is a need for additional microstructured film constructions, including those that address or improve one of the drawbacks discussed above.

SUMMARY

In one aspect, the present disclosure describes an article comprising:

a first, microstructured layer comprising a first material, and having first and second opposed major surfaces, the first major surface being a microstructured surface, and the microstructured surface having peaks and valleys, wherein the peaks are microstructural features each having a height defined by the distance between the peak of the respective microstructural feature and an adjacent valley; and a second layer comprising an adhesive material, and having a first and second opposed major surfaces, the adhesive material comprising a reaction product of a mixture comprising (meth)acrylate and epoxy in the presence of each other, wherein at least a portion of the second major surface of the second layer is directly attached to at least a portion of the first major, microstructured surface of the first layer.

In another aspect, the present disclosure describes a method of making the articles described herein, the method comprising:

providing a first layer comprising a mixture comprising (meth)acrylate and an epoxy in the presence of each other, and having a first and second opposed major surface;

at least partially reacting the (meth)acrylate;

laminating a first, microstructured layer having first and second opposed major surfaces such that the first major surface of the first, microstructured layer is attached to the second major surface of the first layer, the first major surface of the first, wherein the microstructured layer is a microstructured surface having microstructual features, wherein the first major surface of the first, microstructured layer is attached to the second major surface of the first layer; and at least partially reacting the epoxy.

Articles described herein are useful, for example, in optical film applications. For example, an article including a regular prismatic microstructured pattern can act as a totally internal reflecting film for use as a brightness enhancement film when combined with a back reflector; an article including a corner-cube prismatic microstructured pattern can act as a retroreflecting film or element for use as reflecting film; and an article including a prismatic microstructured pattern can act as an optical turning film or element for use in an optical display.

DETAILED DESCRIPTION

Exemplary articles described herein comprise, in order, an optional polymeric layer, a microstructured layer, an adhesive layer and an optional polymeric layer (in some embodiments, the polymeric layer is a microstructured layer).

Figure 1:
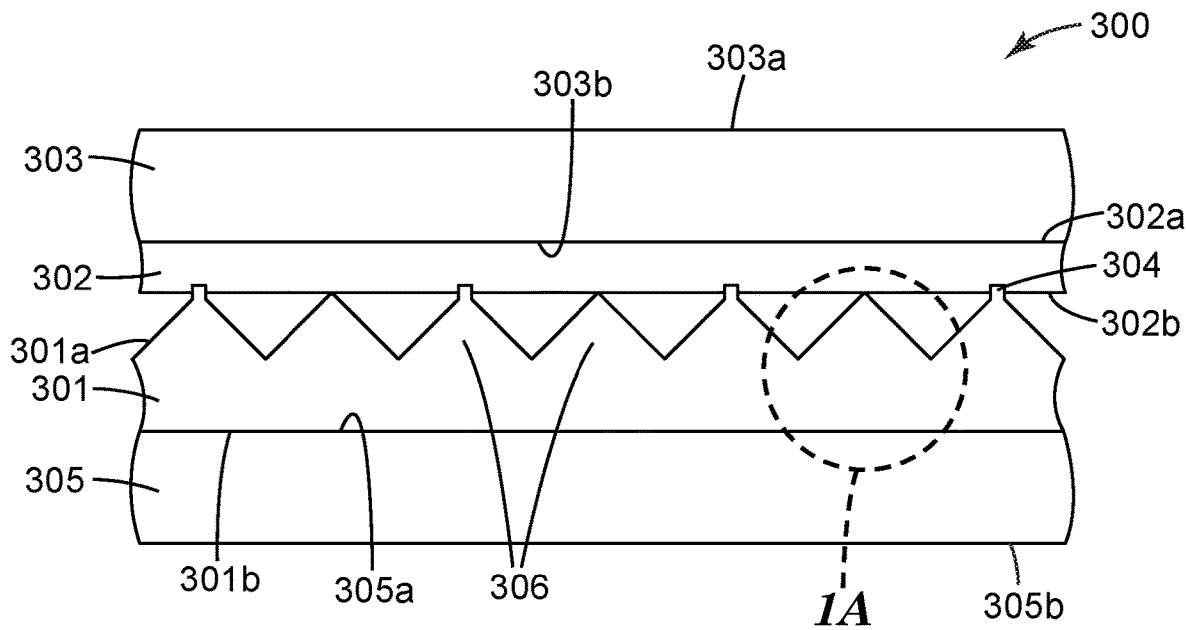
FIGS. 1 and 1A are cross-sectional view of an exemplary article described herein.
Figure 1A:
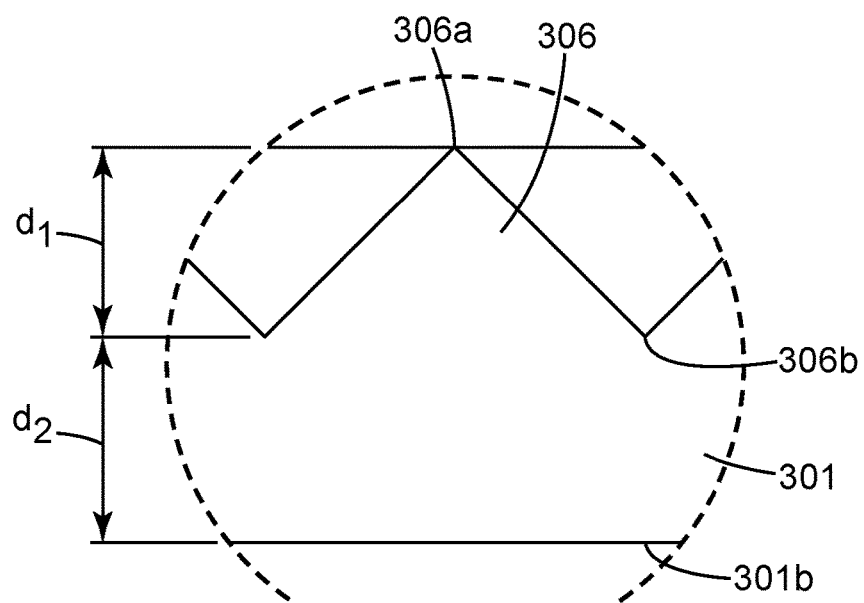

Referring to FIGS. 1 and 1A, exemplary article 300 comprises optional polymeric layer 305, microstructured layer 301, adhesive layer 302, optional polymeric layer (as shown a microstructured layer) 303. Microstructured layer 301 has first and second opposed major surfaces 301a, 301b. Major surface 301a is a microstructured surface. Adhesive layer 302 has first and second opposed major surfaces 302a, 302b. At least a portion of major surface 301a is directly attached to major surface 302b. As shown portion 304 of microstructured surface 301a penetrates into adhesive layer 302. Microstructured surface 301a has microstructual features 306 with peaks 306a and valleys 306b, wherein each microstructure feature height, $d_1$, as measured from a peak (306a) to the lowest adjacent valley (306b). It is understood that the height measurement is the height perpendicular to surface 301b. Microstructured layer 301 has thickness, $d_2$, as measured from to the lowest adjacent (306b) to major surface 301b. Polymeric layer 303 has first and second opposed major surfaces 303a, 303b. At least a portion of major surface 302a is directly attached to major surface 303b.

Optional polymeric layer 305 has first and second opposed major surfaces 305a, 305b. As shown, major surface 305a is directly attached at least in part to major surface 301b. If any optional layer is not present, the respective adjacent major surfaces of layers present may be directly attached.

A microstructured layer has at least one major surface with microstructural features. The microstructual features can have a variety of patterns, including regular prismatic, irregular prismatic patterns (e.g., an annular prismatic pattern, a cube-corner pattern or any other lenticular microstructure), non-periodic protuberances, pseudo-non-periodic protuberances, or non-periodic depressions, or pseudo-non-periodic depressions.

If the microstructural features of a microstructured layer have a directionality (e.g., linear structures such as prisms), the directionality of the microstructual features may be oriented at any angle. For example, the prisms of a microstructured layer could be parallel or perpendicular or at any other angle relative to the features of another layer.

In general, techniques for making microstructured layers are known in the art (see, e.g., U.S. Pat. No. 5,182,069 (Wick), U.S. Pat. No. 5,175,030 (Lu et al.), U.S. Pat. No. 5,183,597 (Lu), and U.S. Pat. No. 7,074,463 B2 (Jones et al.), the disclosures of which are incorporated herein by reference).

Microstructured layer can be formed, for example, by coating a crosslinkable composition onto a tooling surface, crosslinking the crosslinkable composition and removing the microstructured layer from the tooling surface. Microstructured layers can, for example, also be formed by coating a crosslinkable composition onto a tooling surface, applying a polymeric layer, crosslinking the crosslinkable composition and removing the tooling surface and optionally the polymeric layer. Microstructured layers comprising two microstructured surfaces can, for example, be formed by coating a crosslinkable composition onto a tooling surface, applying a polymeric layer wherein the major surface of the polymer layer in contact with the crosslinkable composition is a microstructured surface, crosslinking the crosslinkable composition and removing the tooling surface and the polymeric layer. Microstructured layers can also be formed, for example, by extruding a molten thermoplastic material onto a tooling surface, cooling the thermoplastic material and removing the tooling surface.

Microstructured layers can comprise, for example, a crosslinkable or crosslinked composition or thermoplastic material. Exemplary crosslinkable or crosslinked compositions include resin compositions that may be curable or cured by a free radical polymerization mechanism. Free radical polymerization can occur by exposure to radiation (e.g., electron beam, ultraviolet light, and/or visible light) and/or heat. Exemplary suitable crosslinkable or crosslinked compositions also include those polymerizable, or polymerized, thermally with the addition of a thermal initiator such as benzoyl peroxide. Radiation-initiated cationically polymerizable resins also may be used. Suitable resins may be blends of photoinitiator and at least one compound bearing an (meth)acrylate group.

Exemplary resins capable of being polymerized by a free radical mechanism include acrylic-based resins derived from epoxies, polyesters, polyethers, and urethanes, ethylenically unsaturated compounds, aminoplast derivatives having at least one pendant (meth)acrylate group, isocyanate derivatives having at least one pendant (meth)acrylate group, epoxy resins other than (meth)acrylated epoxies, and mixtures and combinations thereof. The term (meth)acrylate is used here to encompass both the acrylate and methacrylate compound where ever both the acrylate and methacrylate compound exist. Further details on such resins are reported in U.S. Pat. No. 4,576,850 (Martens), the disclosure of which is incorporated herein by reference.

Ethylenically unsaturated resins include both monomeric and polymeric compounds that contain atoms of carbon, hydrogen and oxygen, and optionally nitrogen, sulfur, and halogens. Oxygen or nitrogen atoms, or both, are generally present in ether, ester, urethane, amide, and urea groups. In some embodiments, ethylenically unsaturated compounds have a number average molecular weight of less than about 4,000 (in some embodiments, esters made from the reaction of compounds containing aliphatic monohydroxy groups, aliphatic polyhydroxy groups, and unsaturated carboxylic acids (e.g., acrylic acid, methacrylic acid, itaconic acid, crotonic acid, iso-crotonic acid, and maleic acid)). Some illustrative examples of compounds having an acrylic or methacrylic group that are suitable for use in the invention are listed below:

(1) Monofunctional compounds: ethyl (meth)acrylate, n-butyl (meth)acrylate, isobutyl (meth)acrylate, 2-ethylhexyl (meth)acrylate, n-hexyl (meth)acrylate, n-octyl (meth)acrylate, isooctyl (meth)acrylate, bornyl (meth)acrylate, tetrahydrofurfuryl (meth)acrylate, 2-phenoxyethyl (meth)acrylate, and N,N-dimethylacrylamide;

(2) Difunctional compounds: 1,4-butanediol di(meth)acrylate, 1,6-hexanediol di(meth)acrylate, neopentylglycol di(meth)acrylate, ethylene glycol di(meth)acrylate, triethyleneglycol di(meth)acrylate, tetraethylene glycol di(meth)acrylate, and diethylene glycol di(meth)acrylate; and (3) Polyfunctional compounds: trimethylolpropane tri(meth)acrylate, glycerol tri(meth)acrylate, pentaerythritol tri(meth)acrylate, pentaerythritol tetra(meth)acrylate, and tris(2-acryloyloxyethyl) isocyanurate.

Some representatives of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide. In some embodiments, at least two (meth)acrylate or ethylenically unsaturated components may be present in the crosslinkable or crosslinked resin composition.

If the resin composition is to be cured by radiation, other than by electron beam, then a photoinitiator may be included in the resin composition. If the resin composition is to be cured thermally, then a thermal initiator may be included in the resin composition. In some embodiments, a combination of radiation and thermal curing may be used, wherein the composition may include both a photoinitiator and a thermal initiator.

Exemplary photoinitiators that can be blended in the resin include the following: benzil, methyl o-benzoate, benzoin, benzoin ethyl ether, benzoin isopropyl ether, benzoin isobutyl ether, etc., benzophenone/tertiary amine, acetophenones (e.g., 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4 (methylthio), phenyl-2-morpholino-1-propanone, bis(2,4,6-trimethylbenzoyl)-phenylphosphine oxide and bis(2,6-dimethoxybenzoyl)(2,4,4-trimethylpentyl)phosphine oxide). The compounds may be used individually or in combination. Cationically polymerizable materials include materials containing epoxy and vinyl ether functional groups. These systems are photoinitiated by onium salt initiators, such as triarylsulfonium, and diaryliodonium salts. Other exemplary crosslinkable or crosslinked resin compositions are described, for example, in U.S. Pat. No. 8,986,812 B2 (Hunt et al.), U.S. Pat. No. 8,282,863 B2 (Jones et al.), and PCT Pub. No. WO 2014/46837, published Mar. 27, 2014, the disclosures of which are incorporated herein by reference.

In some embodiments, the first material of a microstructured layer comprises at least one of a crosslinkable or crosslinked composition. In some embodiments, a microstructured layer consists essentially of the crosslinked material.

Crosslinkable materials can be partially crosslinked by techniques known in the art, including actinic radiation (e.g., e-beam or ultraviolet light). Techniques for partially crosslinking a crosslinkable material include exposing an (meth) acrylate moiety containing composition to actinic radiation in the presence of an oxygen containing atmosphere. The (meth)acrylate containing composition can be further crosslinked by exposure to actinic radiation in an atmosphere substantially free of oxygen. Techniques for partially crosslinking a crosslinkable composition further include using a crosslinkable composition that comprises components that react with more than one type of crosslinking reaction where the reactions can initiated independently (e.g., a mixture containing both epoxy components that can be crosslinked by cationic polymerization and (meth)acrylate components that can be crosslinked by free radical polymerization). The crosslinkable composition can be partially crosslinked at a short time after initiating the crosslinking reaction (e.g., a cationic polymerization of an epoxy). The partially crosslinked composition can be further cured by techniques known in the art such as actinic radiation (e.g., e-beam, ultraviolet light, or visible light).

Materials used in crosslinkable compositions are available for example, from Sartomer Company, Exton Pa.; Cytec Industries, Woodland Park, N.J.; Soken Chemical, Tokyo, Japan; Daicel (USA), Inc., Fort Lee, N.J.; Allnex, Brussels, Belgium; BASF Corporation, Charlotte, N.C.; Dow Chemical Company, Midland, Mich.; Miwon Specialty Chemical Co. Ltd., Gyoenggi-do, Korea; Hampford Research Inc. Stratford, Conn.; and Sigma Aldrich, St Louis, Mo.

Exemplary thermoplastic materials include those materials that can be processed by thermoplastic processing techniques such as extrusion. Exemplary thermoplastic materials include polyethylene, polypropylene, polymethyl methacrylate, polycarbonate, and polyester.

Microstructured layers can be provided, for example, by techniques known in the art. In some embodiments, the microstructured layer can be formed by extruding a molten thermoplastic material onto a tooling surface, cooling the thermoplastic material, and removing the microstructured layer from the tooling surface (see, e.g., U.S. Pat. No. 3,515,778 (Fields et al.) and U.S. Pat. No. 4,097,634 (Bergh), the disclosures of which are incorporated herein by reference), wherein the tooling surface is a mold for forming the microstructured first major surface of the microstructured layer.

In some embodiments, the microstructured layer is provided by coating a resin upon a tooling surface, curing the resin, and removing the microstructured layer from the tooling surface, wherein the tooling surface is a mold for forming the microstructured first major surface of the microstructured layer. The microstructured layer can be formed, for example, by applying a crosslinkable material onto a tooling surface, pressing a flexible polymeric film that does not adhere to the crosslinked material to the coated tooling surface, crosslinking the crosslinkable material, removing the polymeric film and then removing the microstructured layer.

In some embodiments, a polymeric layer is attached to the second major surface of the microstructured layer prior to curing the resin. The microstructured layer can be formed, for example, by applying crosslinkable material onto a tooling surface, pressing a flexible polymeric film that does adhere to the crosslinked material to the coated tooling surface, crosslinking the crosslinkable material, removing the microstructured layer with second major surface of microstructured layer attached to the polymeric film.

In some embodiments, both major surfaces of a microstructured layer include a microstructured surface. In some embodiments, a microstructured layer has a thickness defined by the smallest distance from any valley to the second major surface of the first, microstructured layer, and wherein the thickness is not greater than 25 micrometers (in some embodiments, not greater than 20 micrometers, 15 micrometers, or even not greater than 10 micrometers.

In some embodiments, the height of a microstructural feature of microstructured layer is in the range from 1 micrometer to 200 micrometers (in some embodiments, in the range from 1 micrometer to 150 micrometers, 5 micrometers to 150 micrometers, or even 5 micrometers to 100 micrometers).

In some embodiments, a portion of each of the microstructural features of the first, microstructured layer at least partially penetrates into the second material of the second layer (in some embodiments, the first, microstructured layer at least partially penetrates into the second material of the second layer to a depth less than the average height of the respective microstructural feature). In some embodiments, the penetration depth of the each penetrating microstructural feature is not greater than 50 (in some embodiments, not greater than 45, 40, 35, 30, 25, 20, 15, 10, or even not greater than 5) percent of the respective height of the microstructural feature. The foregoing can also apply to other microstructural layers with regard to microstructural features adjacent to the major surface of an adjacent layer.

The adhesive material comprises a reaction product of a mixture comprising (meth)acrylate and epoxy in the presence of each other. In some embodiments, the (meth)acrylate is present in a range from 5 to 95 (in some embodiments, in a range from, 10 to 90 or even 20 to 80) percent by weight and the epoxy is present in a range from 5 to 95 (in some embodiments, in a range from 5 to 95, 10 to 90, or even 20 to 80) percent by weight, based on the total weight of the mixture. Exemplary (meth)acrylates include monofunctional (meth)acrylate compounds (e.g., ethyl (meth)acrylate, n-butyl (meth)acrylate, isobutyl (meth)acrylate, 2-ethylhexyl (meth)acrylate, n-hexyl (meth)acrylate, n-octyl (meth) acrylate, isooctyl (meth)acrylate, isobornyl (meth)acrylate, tetrahydrofurfuryl (meth)acrylate, 2-phenoxyethyl (meth) acrylate, methoxy polyethylene glycol mono(meth)acrylate and N,N-dimethylacrylamide), difunctional (meth)acrylate materials (e.g., 1,4-butanediol di(meth)acrylate, 1,6-hexanediol di(meth)acrylate, neopentylglycol di(meth)acrylate, ethylene glycol di(meth)acrylate, triethyleneglycol di(meth) acrylate, tetraethylene glycol di(meth)acrylate, diethylene glycol di(meth)acrylate and polyfunctional (meth)acrylate materials (e.g., trimethylolpropane tri(meth)acrylate, ethoxylate trimethylolpropane tri(meth)acrylate, glyceroltri (meth)acrylate, pentaerythritol tri(meth)acrylate, and pentaerythritol tetra(meth)acrylate). In some embodiments, two or more (meth)acrylate components may be used in the adhesive material. Exemplary epoxies include (3-4-epoxycyclohexane) methyl 3'-4'-epoxycyclohexyl-carboxylate, bis (3,4-epoxycyclohexylmethyl) adipate, 4-vinyl-1-cyclohexene 1,2-epoxide, polyethylene glycol diepoxide, vinylcyclohexene dioxide, neopentyl glycol diglycidyl ether and 1,4-cyclohexanedimethanol bis(3,4-epoxycyclohexanecarboxylate. In some embodiments, the (meth)acrylate and the epoxy are present on the same molecule (e.g., (3-4- epoxycyclohexyl) methyl acrylate, 3,4-epoxycyclohexylmethyl methacrylate, glycidyl (meth)acrylate, and 4-hydroxybutyl (meth)acrylate glycidylether). In some embodiments, the mixture further comprises polyol functionalities (e.g., polyethylene glycol, polyester diol derived from caprolactone monomer, polyester triol derived from caprolactone monomer). In some embodiments, the mixture is substantially free of monofunctional (meth)acrylates (i.e., contains less than 10 percent by weight of monofunctional (meth)acrylates, based on the total weight of the adhesive material). In some embodiments, the (meth)acrylate and the epoxy do not react with each other.

In some embodiments, it may be desirable to incorporate diffusion (i.e., a coating or coatings or a layer or layers that diffuse(s) light, or elements within an existing layer that diffuse light) in order, for example, to reduce the visibility of optical defects. In some embodiments, a layer comprising adhesive material further comprises a filler material (e.g., glass beads, polymer beads, inorganic particles such as fumed silica). In some embodiments, the adhesive layer may be discontinuous or patterned (e.g., an array of regular or irregular dots).

Exemplary polymeric layers include those comprising polyester, polycarbonate, cyclic olefin copolymer or polymethyl methacrylate. Exemplary polymeric layers include multilayer optical films including reflective polarizing film (available, for example, under the trade designation "DUAL BRIGHTNESS ENHANCEMENT FILM" or "ADVANCED POLARIZING FILM" available from 3M Company, St Paul, Minn.) or reflecting films (available, for example, under the trade designation "ENHANCED SPECULAR REFLECTOR" available from 3M Company, St Paul, Minn.). Exemplary polymeric layers include light guides used in optical displays. In some embodiments, exemplary polymeric layers include diffuser layers.

Exemplary diffuser layers include bulk diffusers and surface diffusers known in the art.

Exemplary diffuser layers include an embedded microstructured layer or a layer comprising a filler material, and can be prepared by techniques known in the art. Embedded microstructured layers can be prepared, for example, by creating the microstructural features on the desired surface using a material with a refractive index (e.g., polymeric or cross linkable material) and then coating a different material with a different refractive index (e.g., polymeric or cross linkable material) over the microstructural features. A diffuse layer comprising a filler material can be prepared, for example, by combining a filler material with a refractive index with a polymeric or crosslinkable material with a different refractive index and applying or coating the diffuse mixture onto the desired surface.

Exemplary diffuser layers include layers with a microstructured surface on one or both major surfaces (available, for example, under the trade designation "ULTRA DIFFUSER FILM" available from 3M Company). Exemplary diffuser layers include color conditioning diffusers (available, for example, under the trade designation "3M QUANTUM DOT ENHANCEMENT FILM" available from 3M Company). In some embodiments, only a portion of the microstructured surface of the diffuser layer is attached to an adjacent layer.

In some embodiments, a diffuser layer may be comprised of multiple layer (e.g., a combination of two or more of a cross-linked layer(s), microstructured layer(s), polymeric layer(s), or layer(s) comprising filler material).

A method for making materials described herein comprises:

providing a first layer comprising a mixture comprising (meth)acrylate and an epoxy in the presence of each other, and having a first and second opposed major surface;

at least partially reacting the (meth)acrylate;

laminating a first, microstructured layer having first and second opposed major surfaces such that the first major surface of the first, microstructured layer is attached to the second major surface of the first layer, wherein the first major surface of the first, microstructured layer is a microstructured surface having microstructual features, wherein the first major surface of the first, microstructured layer is attached to the second major surface of the first layer; and at least partially reacting the epoxy.

In some embodiments, reacting the epoxy is done before laminating. In some embodiments, the method further comprises attaching a first polymeric layer (e.g., a polyester layer or multilayer optical film (e.g., polarizing film or reflecting film)) to the second major surface of the first, microstructured layer. In some embodiments, the first, microstructured layer is provided by coating a resin upon a tooling surface, curing the resin, and removing the first, microstructured layer from the tooling surface, wherein the tooling surface is a mold for forming the microstructured first major surface of the first, microstructured layer. In some embodiments, the method further comprises attaching the first polymeric layer to the second major surface of the first, microstructured layer prior to curing the resin. In some embodiments, during the laminating the microstructural features of the microstructured surface of the first, microstructured layer penetrate into the second major surface of the first layer. In some embodiments, the method further comprising attaching a second polymeric layer (e.g., a polyester layer or multilayer optical film (e.g., polarizing film or reflecting film)) to the second major surface of the first layer.

In some embodiments, it is desirable to control the penetration depth of the microstructual features of the first microstructured layer into the second major surface of the first layer. The penetration depth can be controlled, for example, by controlling the thickness of the first layer. The penetration depth can also be controlled by increasing the viscosity of the first layer after the first layer is applied to a surface. For example, the viscosity of the first layer could be increased after coating by dissolving the composition of the first layer in a solvent, applying the composition onto the surface, and then removing the solvent from the composition prior to attaching the microstructual features of the first microstructured layer. The viscosity of the first layer could also be modified by partially crosslinking the composition after applying it onto the surface prior to attaching the microstructured surface of the first microstructured layer.

Crosslinkable compositions can be coated onto the desired surface (e.g., tooling surface or polymeric layer) using known coating techniques (e.g., die coating, gravure coating, screen printing, etc.).

In some embodiments, articles described herein have an optical gain of greater than 2.0 (in some embodiments, greater than 2.1, 2.2, or even greater than 2.3), as measured by the "Measurement of Optical Gain" in the Examples.

In some embodiments, the article has peel strength for peeling the first layer from the third layer of at least 10 (in some embodiments, at least 20, 30, 40, or even at least 50) Newtons per meter when measured by the "Measurement of Peel Strength" in the Examples.

Articles described herein are useful, for example, for in optical film applications. For example, an article including a regular prismatic microstructured pattern can act as a totally internal reflecting film for use as a brightness enhancement film when combined with a back reflector; an article including a corner-cube prismatic microstructured pattern can act as a retroreflecting film or element for use as reflecting film; and an article including a prismatic microstructured pattern can act as an optical turning film or element for use in an optical display.

A backlight system can comprise a light source (i.e., a source capable of being energized or otherwise capable of providing light (e.g., LEDs)), a lightguide or waveplate, a back reflector, and at least one article described herein. Diffusers—either surface diffusers or bulk diffusers—may optionally be included within the backlight to hide visibility of cosmetic defects imparted through manufacturing or handling, or to hide hot spots, headlamp effects, or other non-uniformities. The backlight system may be incorporated, for example, into a display (e.g., a liquid crystal display). The display may include, for example, a liquid crystal module (including at least one absorbing polarizer), and a reflective polarizer (which may already be included in an embodiment of an article described herein).

Exemplary Embodiments

1A. An article comprising:
  a first, microstructured layer comprising a first material, and having first and second opposed major surfaces, the first major surface being a microstructured surface, and the microstructured surface having peaks and valleys, wherein the peaks are microstructural features each having a height defined by the distance between the peak of the respective microstructural feature and an adjacent valley; and
  a second layer comprising an adhesive material, and having a first and second opposed major surfaces, the adhesive material comprising a reaction product of a mixture comprising (meth)acrylate and epoxy in the presence of each other, wherein at least a portion of the second major surface of the second layer is directly attached to at least a portion of the first major, microstructured surface of the first layer.
2A. The article of Exemplary Embodiment 1A, wherein a portion of each of the microstructual features of the first, microstructured layer at least partially penetrates into the adhesive material of the second layer (in some embodiments, the microstructured first layer at least partially penetrates into the adhesive material of the second layer to a depth less the average height of the respective microstructural feature).
3A. The article of Exemplary Embodiment 2A, wherein the penetration depth of the each penetrating microstructural feature is not greater than 50 (in some embodiments, not greater than 45, 40, 35, 30, 25, 20, 15, 10, or even not greater than 5) percent of the respective height of the microstructural feature.
4A. The article of any preceding A Exemplary Embodiment, the (meth)acrylate is present in a range from 5 to 95 (in some embodiments, in a range from, 10 to 90 or even 20 to 80) percent by weight and the epoxy is present in a range from 5 to 95 (in some embodiments, in a range from 5 to 95, 10 to 90, or even 20 to 80) percent by weight, based on the total weight of the mixture.
5A. The article of any preceding A Exemplary Embodiment, wherein the (meth)acrylate is at least one of a monofunctional, difunctional or polyfunctional (meth)acrylate.
6A. The article of any preceding A Exemplary Embodiment, wherein the epoxy is at least one of a monofunctional or difunctional epoxy.
7A. The article of any preceding A Exemplary Embodiment, wherein the (meth)acrylate and the epoxy are present on the same molecule.
8A. The article of any preceding A Exemplary Embodiment, wherein the mixture further comprising polyol functionalities.
9A. The article of any preceding A Exemplary Embodiment, wherein the mixture is substantially free of monofunctional (meth)acrylates.
10A. The article of any preceding A Exemplary Embodiment, wherein the (meth)acrylate and the epoxy do not react with each other.
11A. The article of any preceding A Exemplary Embodiment, wherein the first, microstructured layer has a thickness defined by the smallest distance from any valley to the second major surface of the first, microstructured layer, and wherein the thickness is not greater than 25 micrometers (in some embodiments, not greater than 20 micrometers, or even not greater than 15 micrometers).
12A. The article of any preceding A Exemplary Embodiment, wherein the first, microstructured layer comprises thermoplastic, crosslinkable, or crosslinked composition.
13A. The article of any preceding A Exemplary Embodiment, wherein the microstructural features of the first, microstructured layer includes at least one of the following shapes: regular prismatic, irregular prismatic patterns (e.g., an annular prismatic pattern, a cube-corner pattern or any other lenticular microstructure), non-periodic protuberances, pseudo-non-periodic protuberances, or non-periodic depressions, or pseudo-non-periodic depressions.
14A. The article of any preceding A Exemplary Embodiment, wherein the height of the microstructural features of the first, microstructured layer is in the range from 1 micrometer to 200 micrometers (in some embodiments, in the range from 1 micrometer to 150 micrometers, 5 micrometers to 150 micrometers, or even 5 micrometers to 100 micrometers).
15A. The article of any preceding A Exemplary Embodiment, wherein the second major surfaces of the first, microstructured layer includes a microstructured surface.
16A. The article of any preceding A Exemplary Embodiment, further comprising a third layer comprising a third material, and having first and second opposed major surfaces, wherein the second major surface of the third layer is attached to the first major surface of the second layer.
17A. The article of Exemplary Embodiment 16A, wherein the third layer is a second microstructured layer, wherein the first major surface being a microstructured surface, and the microstructured surface having peaks and valleys, and wherein the peaks are microstructural features each having a height defined by the distance between the peak of the respective microstructural feature and an adjacent valley.
18A. The article of Exemplary Embodiment 17A, wherein the microstructural features of the third layer are in the form of at least one of the following shapes: regular prismatic, irregular prismatic patterns (e.g., an annular prismatic pattern, a cube-corner pattern or any other lenticular microstructure), non-periodic protuberances, pseudo-non-periodic protuberances, or non-periodic depressions, or pseudo-non-periodic depressions.
19A. The article of either Exemplary Embodiment 17A or 18A, wherein the height of the microstructural feature of the third layer is in the range from 1 micrometer to 200 micrometers (in some embodiments, in the range from 1 micrometer to 150 micrometers, 5 micrometers to 150 micrometers, or even 5 micrometers to 100 micrometers).

20A. The article of any of Exemplary Embodiments 17A to 18A, wherein the first major surfaces of the third layer includes a microstructured surface.

21A. The article of Exemplary Embodiment 16A, wherein the third layer is a first polymeric layer (e.g., a polyester layer or multilayer optical film (e.g., polarizing film or reflecting film)).

22A. The article of any preceding A Exemplary Embodiment, further comprising a second polymeric layer (e.g., a polyester layer or multilayer optical film (e.g., polarizing film or reflecting film)) having first and second major surfaces, wherein the first major surface is attached to the second major surface of the first, microstructured layer.

23A. The article of any preceding A Exemplary Embodiment, wherein the second layer further comprises a filler material (e.g., glass beads, polymer beads, inorganic particles such as fumed silica).

24A. The article of any preceding A Exemplary Embodiment having an optical gain greater than 2.0 (in some embodiments, greater than 2.1, 2.2, or even greater than 2.3).

25A. The article of any preceding A Exemplary Embodiment, wherein the article has a peel strength for peeling the first layer from a third layer of at least 10 (in some embodiments, at least 20, 30, 40, or even at least 50) Newtons per meter.

26A. A backlight system comprising a light source, a back reflector, and at least one article of any preceding A Exemplary Embodiment.

1B. A method of making the article of any of Exemplary Embodiments 1A to 25A, the method comprising:
providing a first layer comprising a mixture comprising (meth)acrylate and an epoxy in the presence of each other, and having a first and second opposed major surface;
at least partially reacting the (meth)acrylate;
laminating a first, microstructured layer having first and second opposed major surfaces such that the first major surface of the first, microstructured layer is attached to wherein the second major surface of the first layer, the first major surface of the first, microstructured layer is a microstructured surface having microstructual features, wherein the first major surface of the first, microstructured layer is attached to the second major surface of the first layer; and
at least partially reacting the epoxy.

2B. The method of Exemplary Embodiment 1B, wherein reacting the epoxy is done before laminating.

3B. The method of either Exemplary Embodiment 1B or 2B, further comprising attaching a first polymeric layer (e.g., a polyester layer or multilayer optical film (e.g., polarizing film or reflecting film)) to the second major surface of the first, microstructured layer.

4B. The method of Exemplary Embodiment 1B, wherein the first, microstructured layer is provided by coating a resin upon a tooling surface, curing the resin, and removing the first, microstructured layer from the tooling surface, wherein the tooling surface is a mold for forming the microstructured first major surface of the first, microstructured layer.

5B. The method of Exemplary Embodiment 3B, further comprising attaching the first polymeric layer to the second major surface of the first, microstructured layer prior to curing the resin.

6B. The method of Exemplary Embodiment 1B, wherein during the laminating the microstructural features of the microstructured surface of the first, microstructured layer penetrate into the second major surface of the first layer.

7B. The method of any B Exemplary Embodiment, further comprising attaching a second polymeric layer (e.g., a polyester layer or multilayer optical film (e.g., polarizing film or reflecting film)) to the second major surface of the first, microstructured layer.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Test Methods
Measurement of Optical Gain

Optical gain was measured by placing the film or film laminate on top of a diffusively transmissive hollow light box. The diffuse transmission and reflection of the light box were approximately Lambertian. The light box was a six-sided hollow rectangular solid of dimensions 12.5 cm by 12.5 cm by 11.5 cm made from diffuse polytetrafluoroethylene (PTFE) plates about 0.6 mm thick. One face of the box was designated as the sample surface. The hollow light box had a diffuse reflectance of about 0.83% measured at the sample surface averaged over the 400-700 nm wavelength range.

During the gain test, the box was illuminated from within through a circular hole about 1 cm in diameter in the surface of the box opposite the sample surface, with the light directed toward the sample surface. The illumination was provided by a stabilized broadband incandescent light source attached to a fiber optic bundle used to direct the light (obtained under the trade designation "FOSTEC DCR-III" from Schott North America, Southbridge Mass.) with a one cm diameter fiber bundle extension (obtained under the trade designation "SCHOTT FIBER OPTIC BUNDLE" from Schott North America). A linear absorbing polarizer (obtained under the trade designation "MELLES GRIOT 03 FPG 007" from CVI Melles Griot, Albuquerque, N. Mex.) was mounted on a rotary stage (obtained under the trade designation "ART310-UA-G54-BMS-9DU-HC" from Aerotech, Pittsburgh, Pa.) and placed between the sample and the camera. The camera was focused on the sample surface of the light box at a distance of about 0.28 m and the absorbing polarizer was placed about 1.3 cm from the camera lens.

The luminance of the illuminated light box, measured with the polarizer in place and no sample films in place was greater than 150 candela per square meter ($cd/m^2$). The sample luminance was measured with a spectrometer (obtained under the trade designation "EPP2000" from StellarNet Inc., Tampa, Fla.) connected to a collimating lens via a fiber optic cable (obtained under the trade designation "F1000-VIS-NIR" from StellarNet Inc.); the spectrometer was oriented at normal incidence to the plane of the box sample surface when the sample films were placed on the sample surface. The collimating lens was composed of a lens tube (obtained under the trade designation "SM1L30" from Thorlabs, Newton, N.J.) and a plano-convex lens (obtained under the trade designation "LA1131" from Thorlabs); the setup was assembled to achieve a focused spot size of 5 mm at the detector. Optical gain was determined as the ratio of the luminance with the sample film in place to the luminance from the light box with no sample present. For all films, optical gain was determined at polarizer angles of 0, 45, and 90 degrees relative the sample orientation. The average optical gain of the values measured at 0 and 90 degrees is reported.

Measurement of Thickness

Thickness was measured with a digital indicator (obtained under the trade designation "ID-F125E" from Mitutoyo America, Aurora, Ill.) mounted on a granite base stand (obtained under the trade designation "CDI812-1" from Chicago Dial Indicators Co., Inc, Des Plaines, Ill.). The digital indicator was zeroed while in contact with the granite base. Five measurements of the sample thickness were measured at the corners and center of a 3 cm by 3 cm square. The average of the five thickness measurements was reported.

Measurement of Peel Strength

Peel force was measured using a peel tester (obtained under the trade designation "SP-2000" from IMASS Inc., Accord Mass.). Test strips 1 inch (2.54 cm) wide and about 10 inch (25.4 cm) long were cut parallel to the prism orientation of the bottom prism film. Laminate strips were adhered to the peel tester platform using 1 inch (2.54 cm) wide double-coated tape (obtained under the trade designation "SCOTCH665" from 3M Company, St. Paul Minn.). The peel tester was configured to measure the 180 degree peel force. Samples were oriented so that the non-microstructured surface of the bottom prism film was adhered to the peel tester platform and the top film was attached to the force balance. The load cell capacity was 5 pounds force (22.25 Newtons). Peel force was measured at a platen rate of 12 inches per minute (in/min.) (30.5 centimeters per minute (cm/min.)). Data was collected after an initial delay of 2 seconds. Measurements were then averaged over a test period of 10 seconds. The average force was divided by the width of the sample and reported in Newtons per meter (N/m). The peel strength was calculated by averaging measurements for 3 strips.

Scanning Electron Micrograph Images

Scanning electron micrograph images were obtained by metallizing the sample in a vacuum chamber (obtained under the trade designation "DENTON VACUUM DESK II" from Denton Vacuum LLC, Moorestown N.J.) and imaging in a scanning electron microscope (obtained under the trade designation "PHENOM PURE MODEL PW-100-010" from Phenom-World BV, Eindhoven, The Netherlands).

Preparation of Crosslinkable Resin Composition A

A crosslinkable resin composition was prepared according to Example 2 of U.S. Pat. No. 8,282,863 B2 (Jones, et. al.), the disclosure of which is incorporated herein by reference.

Preparation of Crosslinkable Resin Composition B

A crosslinkable resin composition was prepared by mixing 75 parts by weight epoxy acrylate (obtained under the trade designation "CN-120" from Sartomer Company) 25 parts by weight of 1,6 hexanediol diacrylate (obtained under the trade designation "SR238" from Sartomer Company) 0.25 part by weight initiator (obtained under the trade designation "DAROCUR 1173" from BASF Corporation) and 0.1 part by weight initiator (obtained under the trade designation "IRGACURE TPO" from BASF Corporation).

Preparation of Film A

A prism film was made as generally described in U.S. Pat. No. 5,175,030 (Lu et al.) and U.S. Pat. No. 5,183,597 (Lu), the disclosures of which are incorporated herein by reference. Specifically, the prism film was made using Crosslinkable Resin Composition A and a master tool with prisms with a 90 degree angle spaced every 0.024 mm (24 micrometers) that was produced according to the process described in U.S. Pat. Pub. No. 2009/0041553 (Burke et al.), the disclosures of which are incorporated herein by reference. A 0.029 millimeter (mm) (29 micrometer) thick conventional biaxially-oriented polyester film with an adhesion promoter (obtained under the trade designation "RHOPLEX 3208" from Dow Chemical Company, Midland, Mich.) on both surfaces was used to make Film A.

Preparation of Film B

A microstructured film was prepared as generally described in U.S. Pat. No. 5,175,030 (Lu et al.) and U.S. Pat. No. 5,183,597 (Lu), the disclosures of which are incorporated herein by reference. More specifically Film B was a prism film described in U.S. Pat. Pub. No. 2013/0004728 (Boyd et al.), the disclosure of which is incorporated herein by reference. The microstructured layer included the bonding portions described in U.S. Pat. Pub. No. 2013/0004728 (Boyd et al.) on each prism. The prisms had a 90 degree angle and were spaced every 0.024 mm (24 micrometer). A 0.029 mm (29 micrometer) thick conventional biaxially-oriented polyester film with an adhesion promoter ("RHOPLEX 3208") and Crosslinkable Resin Composition B were used to make Film B.

Material Components

Table 1 (below) lists the material components and suppliers used in the Examples.

TABLE 1

| Component (obtained under trade designation) | Supplier | Description |
| --- | --- | --- |
| "OPPI SbF$_6$" | Hampford Research Inc., Stratford, CT | (4-octyloxyphenyl) phenyliodonium hexafluoroantimonate |
| "ADDITOL ITX" | Allnex, Brussels, Belgium | isopropyl thioxanthone (2 and 4 isomer mixture) |
| "DAROCUR 4265" | BASF Corporation, Charlotte, NC | blend of acyl phosphine oxide/alpha hydroxy ketone |
| "CELLOXIDE 2021P" | Daicel (USA), Inc., Fort Lee, NJ | (3-4-epoxycyclohexane) methyl 3'-4'-epoxycyclohexyl-carboxylate |
| "PEG 400" | Dow Chemical Company, Midland, MI | polyethylene glycol with average molecular weight of 400 |
| "CAPA 2054" | Perstorp, Malmo, Sweden | linear polyester diol derived from caprolactone monomer |
| "TMPO" | Perstorp | 3-Ethyloxetane-3-methanol |
| "CLYOMER A200" | Daicel (USA), Inc. | (3-4-Epoxycyclohexyl) methyl acrylate |
| "CD 553" | Sartomer Company, Exton, PA | methoxy polyethylene glycol monoacrylate with a number average molecular weight of 550 |

TABLE 1-continued

| Component (obtained under trade designation) | Supplier | Description |
|---|---|---|
| "SR 499" | Sartomer Company | ethoxylated (6) trimethylolpropane triacrylate |
| "TAS SbF$_6$" | Sigma Aldrich, St. Louis, MO | 50% triarylsulfonium hexafluoroantimonate salts, mixed in propylene carbonate |
| "CAPA 3091" | Perstorp | linear polyester triol derived from caprolactone monomer with a number average molecular weight of 900 |
| "IRGACURE TPO" | BASF Corporation | 2,4,6-trimethylbenzoyl-diphenyl-phosphineoxide |

Crosslinkable Resin Compositions

Crosslinkable resin compositions used in Examples 1 to 4 are listed in Table 2, below.

TABLE 2

| | Parts by Weight | | | |
|---|---|---|---|---|
| Component | Mixture A | Mixture B | Mixture C | Mixture D |
| "OPPI SbF$_6$" | 1 | 1 | 1 | 0 |
| "TAS SbF$_6$" | 0 | 0 | 0 | 4 |
| "ADDITOL ITX" | 0.125 | 0.125 | 0.125 | 0 |
| "DAROCUR 4265" | 0.5 | 0.5 | 0.5 | 0 |
| "IRGACURE TPO" | 0 | 0 | 0 | 1 |
| "CELLOXIDE 2021P" | 65 | 65 | 65 | 55 |
| "CARBOWAX PEG 400" | 28 | 0 | 14 | 0 |
| "CAPA 2054" | 0 | 28 | 0 | 0 |
| "TMPO" | 0 | 0 | 14 | 0 |
| "CAPA 3091" | 0 | 0 | 0 | 20 |
| SR 499 | 10 | 10 | 10 | 25 |

Example 1

Mixture A was prepared by mixing the components in Table 1 (above) at the indicated weight ratios. Mixture A was coated onto the non-microstructured surface of Film A by placing a bead of Mixture A along one edge of Film A and spreading the mixture using a wire wound rod (obtained under the trade designation "#3 WIRE WOUND ROD" from RD Specialties, Webster, N.Y.). The coated side of Film A was then exposed to UV light from a UV curing system (obtained under the trade designation "FUSION UV CURING SYSTEM" from Fusion UV Systems, Inc., Gaithersburg, Md.) with a D bulb and aluminum reflector operating at 2400 watts in a nitrogen purged environment at a speed of 7.6 meters per minute (m/min). The microstructured side of a Film B was laminated onto the coated side of Film A fifteen seconds after UV exposure and further irradiated with UV light from a UV curing system ("FUSION UV CURING SYSTEM") with two rows of D bulbs each operating at 3600 watts at a speed of 7.6 m/min. The peel strength of the resulting Example 1 was evaluated and is reported in Table 3 (below). The optical gain of the Example 1 article was measured and is also reported in Table 3 (below).

TABLE 3

| Example | Mixture | Peel, N/m | Optical Gain |
|---|---|---|---|
| 1 | A | 93 | 1.86 |
| 2 | B | 0.39 | 2.27 |
| 3 | C | 33.2 | 1.87 |
| 4 | D | 64.5 | 2.07 |
| 5 | E | 3.9 | 2.26 |

Figure 2:
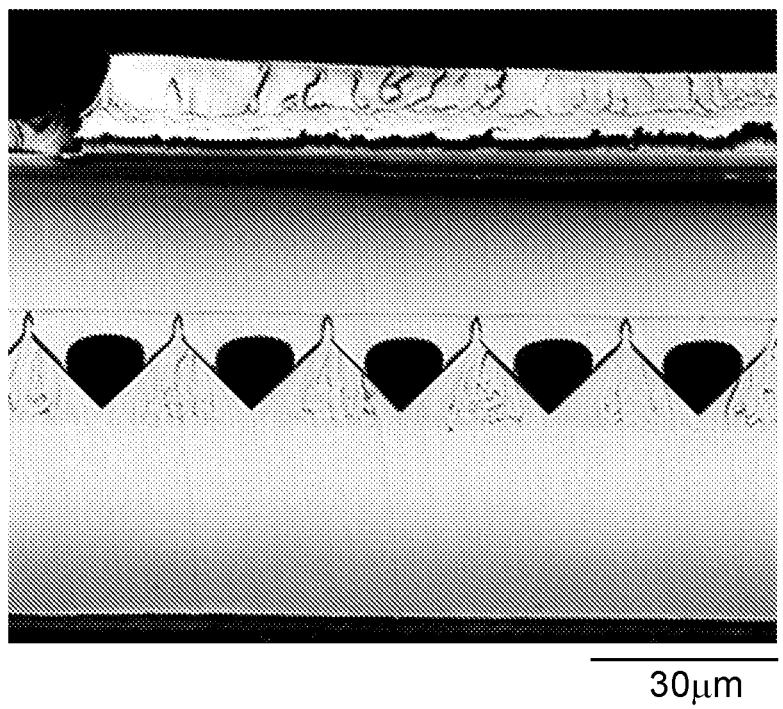
FIG. 2 is a scanning electron microscopy (SEM) photomicrograph of the Example 1 article at 2000× cut perpendicular to the prisms of the first microstructured layer.

A cross sectional sample of the Example 1 article was prepared by cutting with a razor blade approximately perpendicular to the prisms of Film B. FIG. 2 is a SEM photomicrograph of the Example 1 article at 2000×.

Examples 2 and 3

Examples 2 and 3 were prepared as Example 1 except Mixtures B and C were prepared using the indicated weight ratios in Table 1 (above) and used in place of Mixture A. The peel strength and optical gain of the resulting Example 2 and Example 3 articles are reported in Table 3 (above).

Example 4

Figure 3:
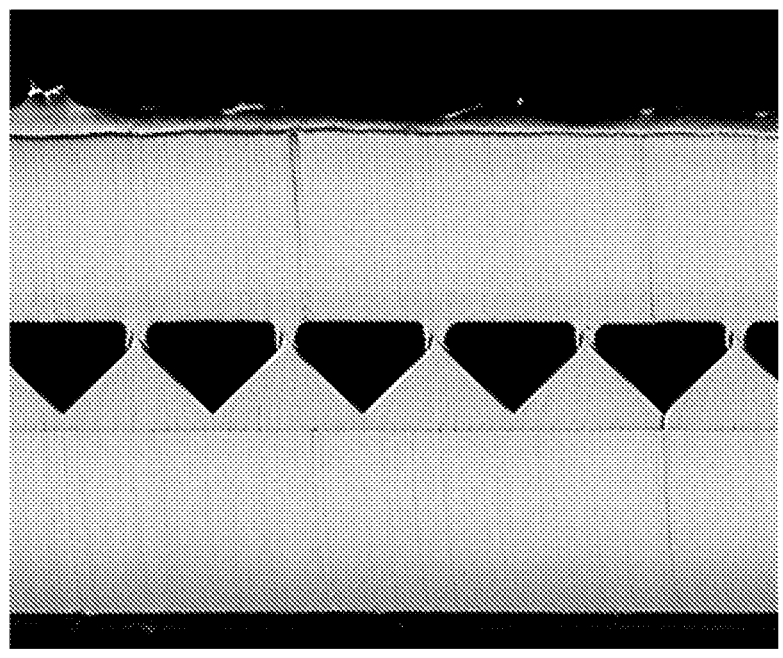
FIG. 3 is an SEM photomicrograph of the Example 4 article at 2000× cut perpendicular to the prisms of the first microstructured layer.

Mixture D was prepared by mixing the components in Table 1 (above) at the indicated weight ratios. Mixture D was coated onto Film A by placing a bead of Mixture D along one edge of Film A and spreading the mixture using a wire wound rod ("#3 WIRE WOUND ROD"). The coated side of Film A was exposed to UV light from a UV system (obtained under the trade designation "FIREPOWER FP501" from Phoseon Technology Inc. Hillboro, Oreg.) operating at 16 watts per square centimeter (W/cm$^2$) in a nitrogen purged atmosphere at a distance of 1.9 centimeters (cm) and at a speed of 7.6 m/min. The microstructured side of a Film B was laminated onto and the coated side of Film A fifteen seconds after UV exposure and further irradiated with UV light from a UV curing system ("FUSION UV CURING SYSTEM") with two rows of D bulbs each operating at 3600 watts at a speed of 7.6 m/min. The peel strength and optical gain of the resulting Example 4 article were measured and are reported in Table 3 (above). A cross sectional sample of the Example 4 article was prepared by cutting with a razor blade approximately perpendicular to the prisms of Film B. FIG. 3 is a SEM photomicrograph of the Example 4 article at 2000×.

TABLE 4

| Component | Parts by Weight in Mixture E |
|---|---|
| "TAS SbF$_6$" | 4 |
| "IRGACURE TPO" | 1 |
| "CLYOMER A200" | 65 |
| "CD 553" | 20 |
| "CAPA 3091" | 15 |
| "CELLOXIDE | 0 |

TABLE 4-continued

| Component | Parts by Weight in Mixture E |
|---|---|
| 2021P" | |
| "SR 499" | 0 |

Example 5

Figure 4:
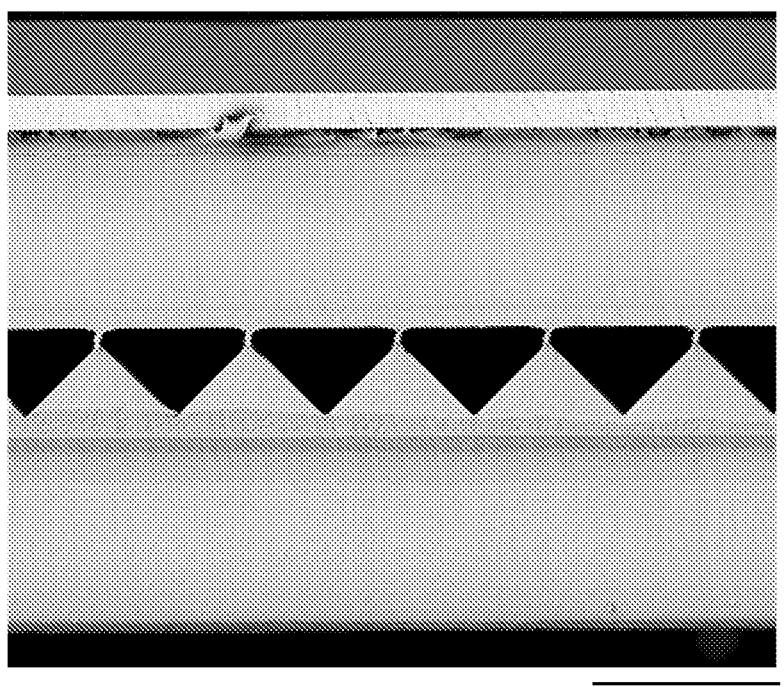
FIG. 4 is an SEM photomicrograph of the Example 5 article at 2000× cut perpendicular to the prisms of the first microstructured layer.

Mixture E was prepared by mixing the components listed in Table 4 (above) and then coated onto the non-microstructured surface of Film A by placing a bead of Mixture E along one edge of Film A and spreading the mixture with a wire wound rod ("#3 WIRE WOUND ROD"). The coated side of Film A was exposed to UV light from a UV system ("FIRE-POWER FP501") operating at 16 W/cm$^2$ peak irradiance in a nitrogen purged atmosphere at a distance of 1.9 cm and a speed of 7.6 m/min. The microstructured surface of Film B was laminated to the coated side of Film A. The construction was then exposed to UV light from a UV curing system ("FUSION UV CURING SYSTEM") with a D bulb and aluminum reflector operating at 3600 watts and a speed of 7.6 m/min. The peel strength and optical gain of resulting Example 5 were measured and are reported in Table 3 (above). A cross sectional sample of the Example 5 article was prepared by cutting with a razor blade approximately perpendicular to the prisms of Film B. FIG. 4 is a SEM photomicrograph of the Example 5 article at 2000×.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising:
   a first, microstructured layer comprising a first material, and having first and second opposed major surfaces, the first major surface being a microstructured surface, and the microstructured surface having peaks and valleys, wherein the peaks are regular, prismatic microstructural features of a totally internal reflecting film each having a height defined by the distance between the peak of the respective microstructural feature and an adjacent valley, and wherein the microstructured surface is an embedded microstructured surface, such that each of the peaks and valleys is coated by an embedding material having a refractive index different from the first material; and
   a second layer comprising an adhesive material, and having a first and second opposed major surfaces, the adhesive material comprising a reaction product of a mixture comprising (meth)acrylate and epoxy in the presence of each other, wherein at least a portion of the second major surface of the second layer is directly attached to at least a portion of the first major, microstructured surface of the first layer, wherein a portion of each of the peaks of the embedded microstructured surface of the first, microstructured layer at least partially penetrates into the adhesive material of the second layer.

2. The article of claim 1, wherein the penetration depth of the each penetrating peak is not greater than 25 percent of the respective height of the microstructural feature.

3. The article of claim 1, wherein the (meth)acrylate is present in a range from 5 to 95 percent by weight and the epoxy is present in a range from 5 to 95 percent by weight, based on the total weight of the mixture.

4. The article of claim 1, wherein the (meth)acrylate is at least one of a monofunctional, difunctional or polyfunctional (meth)acrylate.

5. The article of claim 1, wherein the epoxy is at least one of monofunctional or difunctional epoxy.

6. The article of claim 1, wherein the (meth)acrylate and the epoxy are present on the same molecule.

7. The article of claim 1, wherein the mixture further comprising polyol functionalities.

8. The article of claim 1, wherein the mixture is substantially free of monofunctional (meth)acrylates.

9. The article of claim 1, wherein the (meth)acrylate and the epoxy do not react with each other.

10. A method of making the article of claim 1, the method comprising:
    providing a first layer comprising a mixture comprising (meth)acrylate and an epoxy in the presence of each other, and having a first and second opposed major surface;
    at least partially reacting the (meth)acrylate;
    laminating a first, microstructured layer having first and second opposed major surfaces such that the first major surface of the first, microstructured layer is attached to the second major surface of the first layer, wherein the first major surface of the first, microstructured layer is a microstructured surface having microstructural features, and wherein the first major surface of the first, microstructured layer is attached to the second major surface of the first layer; and
    at least partially reacting the epoxy.

* * * * *